United States Patent [19]
Berglund et al.

[11] 4,445,166
[45] Apr. 24, 1984

[54] HIGH VOLTAGE CONVERTER

[75] Inventors: Lars-Åke Berglund, Gothenburg; Carl-Gunnar Andersson, Hisingsbacka, both of Sweden

[73] Assignee: Telefonaktiebolaget L M Ericsson, Stockholm, Sweden

[21] Appl. No.: 366,606

[22] Filed: Apr. 8, 1982

[30] Foreign Application Priority Data

Apr. 28, 1981 [SE] Sweden ............................ 8102674

[51] Int. Cl.³ .............................................. H02M 1/14
[52] U.S. Cl. ........................................ 363/48; 363/21; 363/61; 363/68
[58] Field of Search ................ 363/19, 21, 23, 25, 363/26, 48, 60, 61, 68, 57, 47

[56] References Cited
U.S. PATENT DOCUMENTS

3,886,434  5/1975  Schreiner ............................ 363/68
3,889,173  6/1975  Klusmann et al. .................... 363/21

*Primary Examiner*—William H. Beha, Jr.
*Attorney, Agent, or Firm*—Hane, Roberts, Spiecens & Cohen

[57] ABSTRACT

A high voltage converter converts an incoming high frequency pulse voltage to a direct voltage at a level which can be varied by varying the pulse width. The converter contains a transformer (T) with its primary side (p) connected to a pulse source (U) and to a controllable switch (K). The secondary side of the transformer is divided into two sections ($s_1$, $s_2$). One section ($s_1$) is connected to a rectifier in the form of a conventional voltage doubler circuit (D1, D2, Cd1, Cd2) with capacitors in parallel with the secondary winding sections ($s_1$, $s_2$). The other section ($s_2$) is connected to a rectifier bridge (D3–D6) and a smoothing filer ($L_f$, $C_f$). The converter output is the doubler circuit output in series with the smoothing filter output.

3 Claims, 9 Drawing Figures

HIGH VOLTAGE CONVERTER

TECHNICAL FIELD

The present invention relates to a high voltage converter, giving on its output side a direct voltage at a level which can be varied by means of pulse width regulation of a pulse voltage applied to its input side. Specifically, there is intended a converter in which the rectifier means on the secondary side of the incorporated high voltage transformer has been given a special implementation. Such a converter is used as a power source in radar equipment, for example.

BACKGROUND ART

High voltage converters for generating a direct voltage from a pulse-shaped volage, where the level of the direct voltage can be varied by regulating the pulse width of incoming voltage pulses are generally known in a plurality of embodiments. The Swedish Pat. No. 7707182, for example, describes a clock pulse-controlled unit for mains connection, which is intended for lower voltages, but in which the primary side of the incorporated transformer is connected to controllable switching members and the secondary side is connected to a smoothing filter. The transformer in the known converter has a plurality of secondary windings, across which are obtained the voltage-stabilized output voltage and an unstablized output voltage.

DISCLOSURE OF THE INVENTION

In high voltage converters there are problems in transforming, where the ratio is high (1:20) for the transformer incorporated, when it is fed with pulse width regulated square voltage of a frequency greater than 10 kHz. To a large extent, the problem arises because the transformer secondary winding has a given self-capacitance, which effects power transmission at high voltage levels across the secondary winding. This can be neutralized in some degree by utilizing a capacitative voltage multiplier circuit. The use of such a circuit has the accompanying disadvantage, however, that the primary current increases linearly during the conducting period (ramping) of the switching member instead of being constant, which heavily loads the switching member.

In accordance with the invention, the secondary side of the high voltage transformer is loaded by two different kinds of rectifier, a voltage multiplier circuit including capacitors in parallel with the secondary winding, and a full-wave rectifier with a smoothing filter. The effect of the secondary side capacitance will then be substantially reduced by the voltage multiplier circuit, simultaneously as the primary current ramping when solely using a voltage multiplying circuit may be reduced by the full-wave rectifier together with the smoothing filter.

The invention is characterized as will be seen from the characterizing portion of claim 1.

DESCRIPTION OF FIGURES

The invention will now be described in detail while referring to the appended drawings, on which

PREFERRED EMBODIMENT

Before the invention is described in detail, the problem situation as well as some known embodiments of voltage converters will be accounted for, while referring to FIGS. 1-3 and 5-7.

Figure 1:
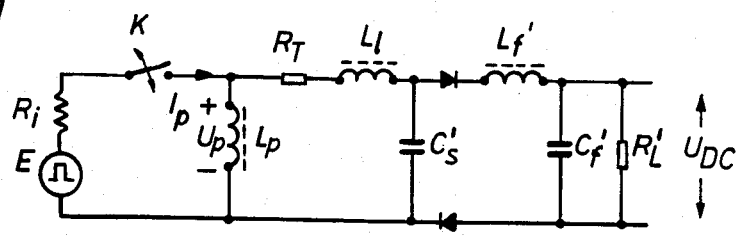
FIG. 1 is an equivalent circuit diagram for a transformer.

The equivalent diagram for a high voltage transformer will be seen from FIG. 1, where the denotations used have the following significance:

$n$ = a ratio between secondary and primary winding
$E$ = applied voltage
$R_i$ = resistance of voltage source and switching member
$K$ = switching member
$L_p$ = primary inductance (primary shunt inductance) of the transformer
$R_T$ = resistance in primary and secondary windings of the transformer
$L_l$ = the transformer leakage inductance, from the primary side
$C_s'$ = self-capacitance of secondary winding transferred to the primary side, according to $C_s \cdot n^2$
$L_f'$ = inductance of filter inductor transferred to the primary side, $L_f(1/n^2)$
$C_f'$ = capacitance of filter capacitor transferred to the primary side, $C_f \cdot n^2$
$R_L'$ = load resistance transferred to the primary side, $R_L(1/n^2)$ Before K is switched on (at the end of the preceding half period) $C_s'$ is not charged. When K is switched on, $C_s'$ must be charged through $L_l$ to a voltage greater than $U_{DC}$ for current to flow through $L_f'$ and power be transmitted to $R_L'$.

$L_l$ and $C_s'$ constitute an oscillating circuit with a resonance frequency:

$$\frac{1}{2\pi \sqrt{L_l C_{s'}}} = f_o$$

For converter power of 2 kW the following parameters are realistic with a normally wound high voltage transformer with a ratio of 1:100.

$L_l = 5$ H    $C_s = 300$ pF    giving
$C_s' = 300 \cdot 10^{-12} \cdot 100^2 = 3 \cdot 10^{-6}$ $$f_o = \frac{1}{2 \, 5 \cdot 10^{-6} \cdot 3 \cdot 10^{-6}} = 41 \text{ kHz}$$

Figure 5:
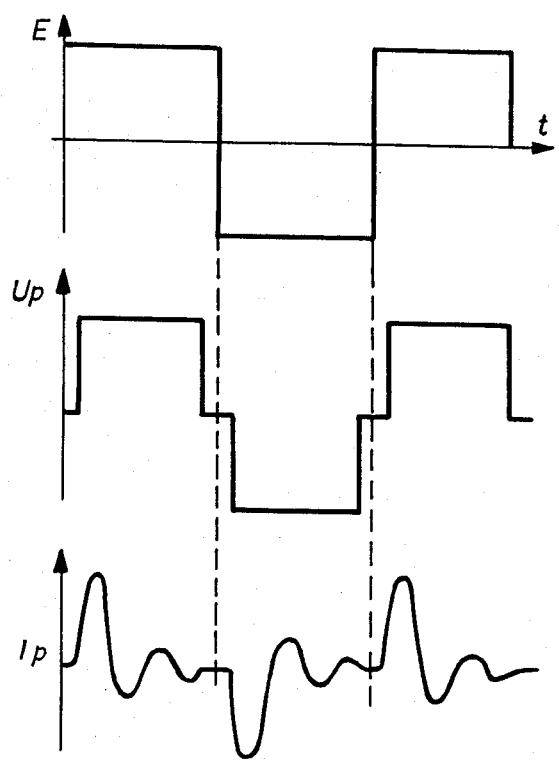
FIG. 5 illustrates the curve shapes of certain quantities occurring in the equivalent diagram according to FIG. 1.
Figure 6:
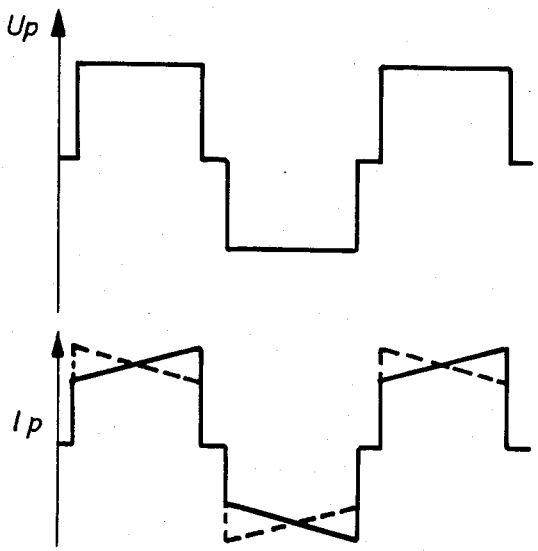
FIGS. 6 and 7 illustrate corresponding quantities for the voltage converters according to FIGS. 2 and 3, respectively.
Figure 7:
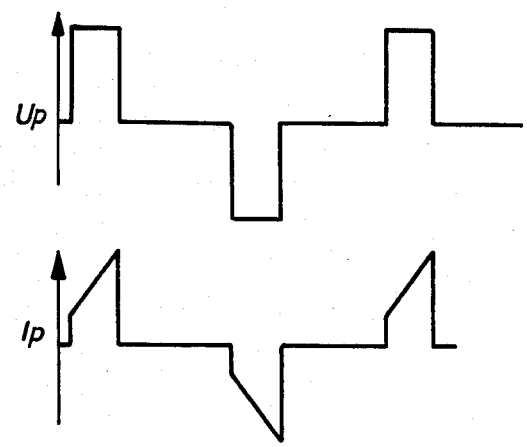

Due to the poor attenuation obtained via the inductance $L_f'$, the primary current oscillates heavily, and only small power is transmitted to the secondary load, see FIG. 5.

Figure 2:
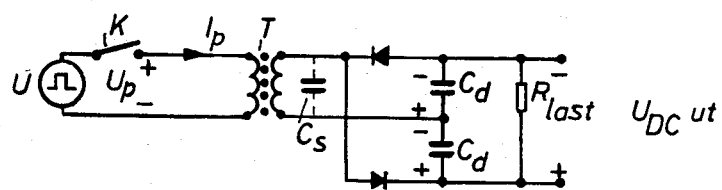
FIGS. 2 and 3 are schematic circuit diagrams of known voltage converters with a voltage doubler and a full wave rectifier, respectively.

One method of eliminating the ringings is to load the secondary side of the transformer with a voltage multiplier according to FIG. 2. Peak rectifying is obtained with a sufficiently large capacitor $C_d$. The capacitor $C_s$ is connected in parallel with the capacitor $C_d$ and the effect of $C_s$ can be neglected. This circuitry has the disadvantage that both primary current and secondary voltage are dependent on the load, and the primary current ramping causes control with pulse width regulation to load the switching member K very heavily, see FIGS. 6 and 7.

Figure 3:
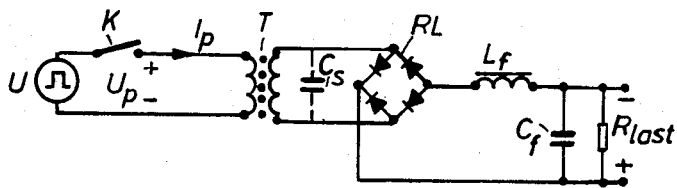

If the secondary side of the transformer is instead loaded with a full wave rectifier RL and a smoothing filter $L_f$, $C_f$, as shown in FIG. 3, the load dependency of the primary current and secondary voltage can be reduced, but the problem with the effect of the secondary capacitance $C_s$ remains.

Figure 4:
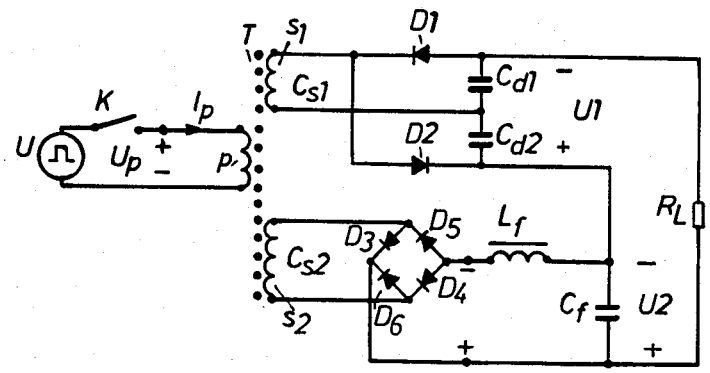
FIG. 4 schematically illustrates a circuit diagram for a converter in accordance with the invention.
Figure 8:
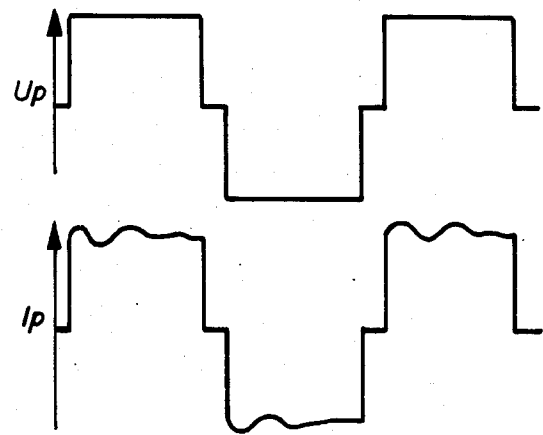
FIGS. 8 and 9 illustrate corresponding quantities for the voltage converter according to FIG. 4.
Figure 9:
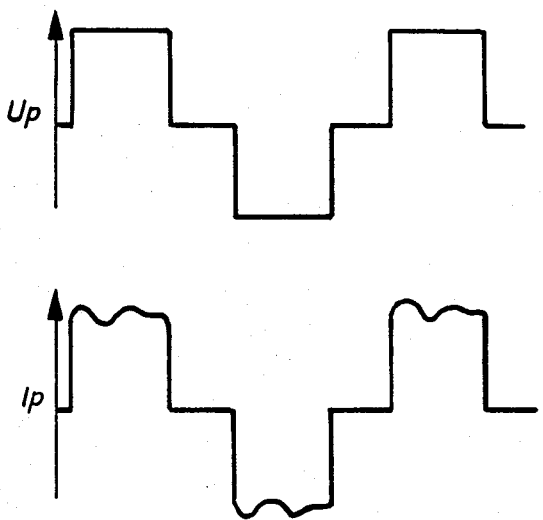

FIG. 4 illustrates a circuit diagram of an embodiment of the invention. A pulse voltage source U, sending a pulse train according to FIG. 5, and a switch K, e.g. a pair of anti-parallel connected power transistors, are connected to the primary side of a high voltage transformer T. The switch K is controlled by a control circuit (not shown) for alternatingly opening and closing the current circuit in the primary winding. The voltage drop $U_p$ across the primary winding is shown in FIGS. 8 and 9. The high-voltage transformer T has comparatively low self capacitance, low magnetic losses and low power losses. An example of this kind of transformer is described in the Swedish Patent No. 8102611. The secondary side of the transformer T is divided into two secondary windings or secondary winding sections $s_1$ and $s_2$. One winding $s_1$ is connected to a voltage doubling circuit comprising diodes D1 and D2 as well as capcitors Cd1 and Cd2. The other secondary winding $s_2$ is connected to a full wave rectifier in the form of a bridge circuit containing the diodes D3, D4, D4 and D6. An inductance $L_f$ and capacitor $C_f$ comprise a smoothing filter and are connected to one diagonal of the diode bridge, the secondary winding $s_2$ being connected to the other diagonal. The connection point of the inductor $L_f$ and capacitor $C_f$ is connected to the capacitor $C_{d2}$ and the diode D2. The converter output formed by the connection point of the diode D1 and capacitor $C_{d1}$ in the doubler circuit and the second terminal of the capacitor $C_f$ in the smoothing filter, the output voltages U1 and U2 from the doubling circuit and smoothing filter, respectively, being in series across the connected load $R_L$.

The proposed high voltage converter thus contains a transformer with its secondary side divided into two secondary winding sections $s_1$ and $s_2$. One section $s_1$ is loaded by a voltage multiplier circuit and the other $s_2$ by a full wave rectifier and subsequent smoothing filter. Both these circuits are connected in series and connected to the converter load.

The advantages of both the voltage multiplier circuit and bridge circuit are utilized in this circulating principle.

The capacitors $C_{d1}$, $C_2$ load the voltage multiplier section and prevent ringing in the winding $s_1$. This voltage multiplier circuit is magnetically connected in parallel with the rectifier bridge, the winding $s_2$ thus also being loaded and the oscillations over $s_2$ are reduced considerably.

The result will be that both good power transmission ability and the pulse width regulation facility are afforded, with the curve shapes according to FIG. 9.

When the pulse width is reduced, the voltage multiplier section will almost entirely retain the voltage across the capacitors $C_{d1}$ and $C_{d2}$, the whole of the output voltage reduction lying across the bridge section, i.e. across the capacitor $C_f$.

The voltage multiplier section does not necessarily need to be a doubler circuit as illustrated in FIG. 4, and it may also comprise a circuit multiplying the secondary voltage by a higher number than 2. The sole condition is that the circuit contains capacitors which are connected in parallel to the secondary winding so that the effect of the secondary winding capacitance is negligable.

We claim:

1. A high voltage converter containing a voltage source (U) alternatingly sending positive and negative pulses, at least one controllable switching member (K) for pulse width regulation of said pulses from the voltage source, a high voltage transformer (T) with a primary winding (p) and two secondary winding section (s1, s2) as well as a rectifier means connected to both secondary winding sections, the primary winding (p) of the transformer being connected to said switching member (K) for transforming up the pulse width-regulated pulses, characterized in that the rectifier means comprises a voltage multiplying circuit containing capacitors (Cd1, Cd2) connected in parallel with said one secondary winding section (s1), and also comprising a full wave rectifier (D3–D6) containing a smoothing filter (L, C) connected to the second secondary winding section (s2), one output terminal of the smoothing filter being connected to one output terminal of the voltage multiplier circuit, and the remaining output terminal of the multiplier circuit and smoothing filter, respectively, forming the high voltage converter output.

2. Converter as claimed in claim 1, characterized in that the voltage multiplier circuit is a doubler circuit, conventionally built up from two mutually opposing directed diodes (D1, D2) connected to two capacitors (Cd1, Cd2) which together form said capacitors in parallel with one secondary winding section (s1).

3. Converter as claimed in claim 1 or 2, characterized in that the full wave rectifier comprises a diode bridge (D3–D6), one output of which is connected in series with an inductance ($L_f$) and in parallel with a capacitor ($C_f$), which form the smoothing filter.

* * * * *